United States Patent [19]

Bajorek et al.

[11] Patent Number: 4,918,554
[45] Date of Patent: Apr. 17, 1990

[54] PROCESS FOR MAKING A SHIELDED MAGNETORESISTIVE SENSOR

[75] Inventors: Christopher H. Bajorek, Rochester, Minn.; Cheng T. Horng; Edward T. Yen, both of San Jose, Calif.

[73] Assignee: International Business Machines Corporation, Armonk, N.Y.

[21] Appl. No.: 249,916

[22] Filed: Sep. 27, 1988

[51] Int. Cl.$^4$ .................. G11B 5/39; G01R 33/02; H01L 43/00; H01F 7/06
[52] U.S. Cl. .................. 360/113; 29/603; 324/252; 338/32 R
[58] Field of Search .................. 360/113; 338/32 R; 324/252; 29/603

[56] References Cited

U.S. PATENT DOCUMENTS

| | | | |
|---|---|---|---|
| 4,639,806 | 1/1987 | Kira | 360/113 |
| 4,783,711 | 11/1988 | Kitada et al. | 360/113 |
| 4,809,109 | 2/1989 | Howard et al. | 360/113 |

Primary Examiner—Robert S. Tupper
Attorney, Agent, or Firm—Otto Schmid, Jr.

[57] ABSTRACT

The method for making a shielded magnetoresistive (MR) sensor in which the first shield is made of sendust and the second shield is made of permalloy. The method comprises the stages of depositing a layer of sendust to form a first shield; heat treating the sendust layer at a temperature greater than 400° C.; depositing a first electrically insulating layer; depositing, in the presence of a magnetic field, a MR layer; depositing a second layer of electrically insulating material; and, depositing a layer of permalloy to form the second shield.

10 Claims, 1 Drawing Sheet

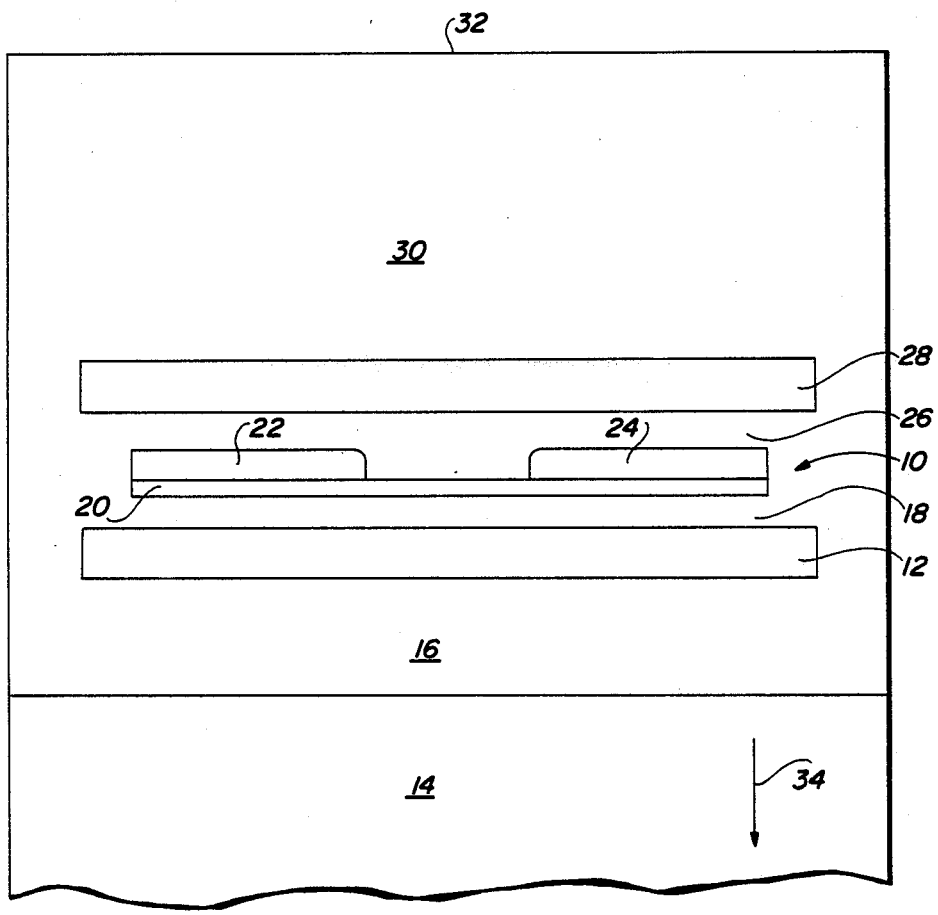

PROCESS FOR MAKING A SHIELDED MAGNETORESISTIVE SENSOR

FIELD OF THE INVENTION

The present invention relates to a magnetoresistive read transducer, and, more particularly to a process for making a shielded magnetoresistive read transducer.

DESCRIPTION OF THE PRIOR ART

The prior art discloses a magnetic transducer referred to as a magnetoresistive (MR) sensor or head which has been shown to be capable of reading data from a surface at great linear densities. An MR sensor detects magnetic field signals through the resistance changes of a read element made from a magnetoresistive material as a function of the amount and direction of magnetic flux being sensed by the MR element.

The drive toward increased recording density has led to the requirement for narrower recording tracks and increased linear recording density along the tracks. In order for an MR read head to be capable of reading data from a mangetic medium at these high recording densities, the MR element must be incorporated in the gap between two magnetic shields. For example, U.S. Pat. No. 4,639,806 to Kira et al. discloses a shield MR element, and discloses that the shields may be made of high permeability magnetic material such as Ni-Zn ferrite, Mn-Zn ferrite, sendust and permalloy.

When using an MR read transducer with a rigid magnetic disk storage system, new design conditions are imposed since materials exposed at the air bearing surface (ABS) of the flying slider, which supports the transducer, are susceptible to damage when the sliders are hit by the asperities or contaminants which may exist on the magnetic recording disks. Among the different conductive materials exposed at the MR head ABS, the leading magnetic shield presents the most serious problem since the shield provides a large volume of material which can be easily scratched or smeared to form a short circuit conducting path between the leading shield and the MR sensor layers, thereby resulting in sensor shorting. This represents an unacceptable MR sensor failure, so the structure of the MR sensor must be designed to avoid such sensor shorting.

One way to avoid sensor shorting would be to use a nonconducting material, such as a ferrite material for the shields. However, this solution introduces other design problems which make this solution less attractive.

No prior art is known which provides a solution to the problem of sensor shorting which utilizes conductive shield materials.

SUMMARY OF THE INVENTION

It is therefore the principal object of this invention to provide a shielded magnetoresistive (MR) read transducer suitable for use in a rigid magnetic disk storage system.

In accordance with the invention, a process for making a shielded MR sensor comprises the steps of depositing a 12% silicon and the remainder iron to form a first shield member, and heat treating this layer of a magnetic alloy to a temperature greater than 400° C. for a predetermined time to enhance the magnetic properties of the first shield member. A first layer of a suitable electrically insulating material is deposited over the first shield member, followed by the deposition, in the presence of a magnetic field, of a thin film of a magnetoresistive conductive layer formed of a magnetic material, where the magnetic field is operable to orient the layer of magnetic material in a preferred direction. A second layer of a suitable electrically insulating material is then deposited over the layer of magnetoresistive material, followed by the deposition of a layer of soft magnetic material to form a second shield member.

The foregoing and other objects, features and advantages of the invention will be apparent from the following more particular description of a preferred embodiment of the invention as illustrated in the accompanying drawings.

BRIEF DESCRIPTION OF THE DRAWING

The drawing is a view showing the air bearing surface of a magnetoresistive read transducer suitable for use with a rigid magnetic disk storage system.

DESCRIPTION OF THE PREFERRED EMBODIMENT

A specific embodiment of a magnetoresistive (MR) read transducer will be described in conjunction with the drawing, which shows a view of the air bearing surface (ABS) of the MR read transducer. The MR read head assembly 10 comprises a first shield member 12 which is separated from substrate 14 by a nonconductive layer 16 of alumina, for example. A first nonmagnetic gap layer 18 is then deposited to serve as a base for deposition of MR sensor element 20. Although MR sensor element 20 is shown as having a single layer, it will be apparent to those skilled in the art that additional layers for properly biasing the sensor, for example, may also be included. MR sensor element is contacted by electrically conductive leads 22 and 24, which are isolated from the second shield member 28 by a second nonmagnetic gap layer 26. A protective layer 30 is then deposited to a desired thickness at the trailing end 32 of the assembly.

In operation, the flying direction of the slider, which supports the MR read transducer, as shown by arrow 34, so, should any sensor shorting occur, this would be evidenced by a bridging of conductive material between the leading shield member 12 (i.e., the first shield that would be subjected to contact with any asperiities on the disk) and the MR sensor element 20 or between the first shield member 12 and conductive lead structure 22 or 24.

From the standpoint of its magnetic characteristics and its compatibility with other materials and processes being used, the NiFe alloy known as permalloy is the preferred material to be used for both first shield member 12 and second shield member 28. However, this cannot be done due to the ductile nature of permalloy, which may lead to sensor shorting.

In accordance with the present invention, the materials for the first shield member 12 and the second shield member 28 are chosen so that MR sensor shorts are eliminated while at the same time maintaining magnetic characteristics for the shield members 12 and 28 equivalent to the magnetic characteristics of permalloy.

The material for the first shield member 12 is the FeSiAl alloy known as sendust and the material for the second shield member 28 is a soft magnetic material such as permalloy. It is not obvious that such a combination of materials can be produced since sendust in its as-deposited state has magnetic characteristics that are vastly inferior to the magnetic characteristics of permalloy. However, the magnetic characteristics of sendust can be enhanced by annealing. To obtain magnetic characteristics equivalent to permalloy, the annealing temperature must be at least 400° C. This presents a problem since, at this temperature, the MR snesor element would be destroyed. However, this problem has been overcome by means of the process to be described.

The process for making an MR read transducer, according to the present invention, comprises the steps of depositing a layer of FeSiAl alloy near the composition known as Sendust (5.4 wt % A. 9.6 wt % Si, 85 wt % Fe). Alloys having between 6 and 12% Si and 3 to 6% Al and the balance FE are suitable. The alloy known as Super Sendust is also suitable and this alloy includes 3 wt % Ni, 4 wt % Al, 6 wt % Si and 87 wt % Fe. The sendust alloy layer is preferably sputter deposited in a vacuum to a thickness of greater than 1 micron, preferably at least 1.6 micron. Preferably the sendust alloy layer should be deposited in such a way as to produce magnetic anistropy in the as-deposited film. The deposited sendust film has a very low permeability which can be enhanced by annealing.

The sendust shield layer is heat treated at a temperature greater than 400° C. for a suitable time preferably in an oriented magnetic field. The preferred treatment is at a temperature of 450–500° C., either in a vacuum or a nitrogen atmosphere, for a time of two hours, for example. A higher temperature can be used in which case the treatment time can be reduced. This heat treatment step must be done prior to deposition of the MR sensor element 20.

The first insulating gap layer 18 is then deposited to serve as a base for the deposition, in the presenc eof a magnetic field, of the MR sensor element 20. MR sensor element 20 may be NiFe, for example, and the magnetic field during deposition causes the orentation of the NiFe material of the MR sensor element 20 in a chosen direction.

The seond nonmagnetic gap layer 26 is then deposited, followed by deposition of the second shield member 28. Note that Sendust cannot be used for the second shield member since it would be necessary to anneal the sendust film, after deposition, at a temperature at least 400° C. This temperature would be above the curie temperature of the NiFe and therefore would destroy the orientation of the NiFe layer. For this reason permalloy is used for the second shield member 28. This material is used due to its magnetic characteristics, its compatibility with other materials and processes used in the MR read transducer, and the fact that no heat treatment is required to achieve the desired magnetic characteristics.

While the invention has been particularly shown and described with reference to a preferred embodiment thereof, it will be understood by those skilled in the art that various other changes in the form and details may be made therein without department from the spirit and scope of the invention.

We claim:

1. The method for making a shielded magnetoresistive sensor comprising the steps of:
    depositing a layer of a magnetic alloy comprising 3 to 6% aluminum, 6 to 12% silicon and the remainder iron to form a first shield member;
    heat treating said layer of a magnetic alloy at a temperature greater than 400° C. for a predetermined time to enhance the magnetic properties of said first shield member;
    depositing a first layer of a suitable electrically insulating material over said first shield member;
    depositing, in the presence of a magnetic field, a thin film of a magnetoresistive conductive layer formed of a magnetic material, said magnetic field being operable to orient said layer of magnetic material in a preferred direction;
    depositing a second layer of a suitable electrically insulating material over said layer of magnetoresistive material; and
    depositing a layer of soft magnetic material over said second layer of said electrically insulating material to form a second shield member.

2. The method of claim 1 wherein said layer of magnetic alloy comprises sendust.

3. The method of claim 1 wherein said layer of magnetic alloy additionally comprises 3% nickel to form super sendust.

4. The method of claim 1 wherein said soft magnetic material is NiFe.

5. The method of claim 2 wherein said soft magnetic material is Ni Fe.

6. The method of claim 2 wherein said heat treatment is carried out at a temperature of 450°–500° C. for a time of about two hours.

7. The method of claim 3 wherein said heat treatment is carried out at a temperature of 450°–500° C. for a time of about two hours.

8. A shielded MR sensor produced by the method of claim 1.

9. A shielded MR sensor produced by the method of claim 6.

10. A shielded MR sensor produced by the method of claim 7.

* * * * *

UNITED STATES PATENT AND TRADEMARK OFFICE
CERTIFICATE OF CORRECTION

PATENT NO. : 4,918,554
DATED : April 17, 1990
INVENTOR(S) : C. H. Bajorek et al

It is certified that error appears in the above-identified patent and that said Letters Patent is hereby corrected as shown below:

Column 1, Line 62, after "depositing a", insert --layer of a magnetic alloy comprising 3 to 6% aluminum, 6 to--

Column 3, Line 36, change "presenc" to --presence--

Column 3, Line 36, change "eof" to --of--

Signed and Sealed this

Seventeenth Day of September, 1991

Attest:

HARRY F. MANBECK, JR.

Attesting Officer

Commissioner of Patents and Trademarks